US011234192B2

(12) United States Patent
Dushane et al.

(10) Patent No.: US 11,234,192 B2
(45) Date of Patent: Jan. 25, 2022

(54) POWER SAVING REMOTE SENSOR SYSTEM AND METHODS

(71) Applicant: VENSTAR, INC., Chatsworth, CA (US)

(72) Inventors: Steven Dushane, Granada Hills, CA (US); Mustafa Oransel, Agoura Hills, CA (US)

(73) Assignee: VENSTAR, INC., Chatsworth (CA)

( * ) Notice: Subject to any disclaimer, the term of this patent is extended or adjusted under 35 U.S.C. 154(b) by 68 days.

(21) Appl. No.: 16/377,014

(22) Filed: Apr. 5, 2019

(65) Prior Publication Data

US 2020/0322888 A1    Oct. 8, 2020

(51) Int. Cl.
*G06F 1/32* (2019.01)
*H04W 52/02* (2009.01)
*H04W 4/38* (2018.01)
*G06F 1/3287* (2019.01)
*G06F 1/3209* (2019.01)

(52) U.S. Cl.
CPC ...... *H04W 52/0235* (2013.01); *G06F 1/3209* (2013.01); *G06F 1/3287* (2013.01); *H04W 4/38* (2018.02); *H04W 52/0229* (2013.01)

(58) Field of Classification Search
None
See application file for complete search history.

(56) References Cited

U.S. PATENT DOCUMENTS

| | | | |
|---|---|---|---|
| 2008/0162682 A1* | 7/2008 | Ramachandran | G06F 1/3203 709/223 |
| 2017/0031671 A1* | 2/2017 | Joshi | G06F 8/654 |
| 2017/0210401 A1* | 7/2017 | Mian | B61L 15/0081 |
| 2017/0354383 A1* | 12/2017 | Odessky | H04L 67/12 |

* cited by examiner

*Primary Examiner* — Fahmida Rahman (74) *Attorney, Agent, or Firm* — Danner IP Law Firm; Allen D. Danner (57) ABSTRACT

The present sensor device, system and method provides tools for measuring, recording local environmental conditions, such as temperature and humidity, and wirelessly transmitting the collected data to a server. The sensor device is configured to, under normal operation, maintain the connection between the wireless network interface controller and the wireless local network so that various commands and/or communications can be received, whether the sensor device is in a low power mode or in an active mode. The sensor device cycles between the low power mode and the active mode, and back to the low power mode. Where in each active mode cycle, the sensor device is configured to acquire a measurement from sensor for storage in local memory, and/or transmit historical data acquired to the server, and/or check for updates by connecting to the server. By normally remaining in a low power mode and only waking periodically to conduct a task, battery life is greatly extended.

25 Claims, 4 Drawing Sheets

POWER SAVING REMOTE SENSOR SYSTEM AND METHODS

BACKGROUND

The subject of this patent application relates generally to wireless remotely located sensors for sensing physical properties, such as temperature, humidity, light, motion, leaks, and other similar local environmental conditions.

By way of background, many facilities must measure and record local environmental conditions at particular areas within the facility or outside the facility, such as temperature, humidity, and the like. In facilities such as hospitals, there is a legal requirement to maintain a record of the local environmental conditions data collected for each designated measurement point, for example, in each patient room, the waiting room, at various points in the halls, and at other points compliant with the law. Due to the expense and difficulty of running power and data lines to each designated measurement point, the devices generally must be wireless (e.g., connected to the internet, local intranet, or other form of radio communications) and powered by battery. Due to the power requirements of a wireless system, the batteries can quickly drain, requiring continuous change and periods of noncompliance.

Accordingly, it is desirable to provide sensor devices and systems and methods for use thereof, configured to reduce battery consumption.

Aspects of the present disclosed subject matter fulfill these needs and provide further related advantages as described in the following summary.

SUMMARY

Aspects of the present invention teach certain benefits in construction and use which give rise to the exemplary advantages described below. The present disclosed subject matter solves the problems described above by providing, in some embodiments, a sensor device configured to connect to a wireless local network comprising a sensor configured to measure a local environmental condition, a memory, a wireless network interface controller; and a hardware processor that, when executing computer executable instructions stored in the memory. The hardware processor is programmed to maintain a connection between the wireless network interface controller and the wireless local network in both a low power mode and an active mode; maintain the low power mode until a wake command is received, wherein the sensor, memory, and the hardware processor are configured to be transitioned from the low power mode to the active mode; receive the wake command, wherein, in the active mode, the sensor measures the local environmental condition and writes a first data point within a first dataset recorded in the memory; receive a low power command, wherein the sensor, memory, and the hardware processor transition from the active mode to the low power mode; receive the wake command, wherein, in the active mode, the wireless network interface controller is in data communication with the server; transmit the first dataset to the server and write the first dataset to a main dataset recorded in a database associated with the server; receive the low power command; and transition to low power mode.

In one or more optional embodiments, the sensor device further comprises a battery power source providing power to the sensor, the memory, the wireless network interface controller, and hardware processor.

In one or more optional embodiments, the sensor device, after the first data point is collected and before the wake command is received immediately prior to the first dataset being transmitted to the server, is further programmed to receive the wake command upon the elapse of an acquisition time interval, the acquisition time interval governing the time between each data acquisition cycle, the data acquisition cycle comprising the transition from the low power mode to the active mode where data is collected and stored and back to the low power mode, and wherein the elapse of the acquisition time interval triggers the wake command; detect the local environmental condition by the sensor; write a second data point within the first data set recorded in the memory; receive the low power command; and transition to the low power mode, until one or both the elapse of the acquisition time interval and the receipt of the wake command unrelated to the acquisition time interval.

In one or more optional embodiments, the sensor device, after the dataset is transmitted to the server and the low power command is received thereafter, is further programmed to write a plurality of data points to the memory, the plurality of data points being collected while in the active mode by the sensor and written within a second dataset recorded in the memory over the course of a plurality of data acquisition cycles.

In one or more optional embodiments, the sensor device is further programmed to receive the wake command upon the elapse of a transmit time interval, the transmit time interval governing the time between each data transmit cycle, wherein the elapse of the acquisition time interval triggers the wake command; transmit the second dataset to the server and write the second dataset to a main dataset recorded in a database associated with the server; receive the low power command; and transition to low power mode.

In one or more optional embodiments, the wake command is triggered by one or more of the elapse of a time period and a command received from an external source via the wireless network interface controller. Further, as an option, the low power mode configurable as one or more of a sleep mode, a standby mode, a low power run mode, a low power sleep mode, and a stop mode.

In one or more optional embodiments, a thermostat is connected to the wireless local network, and the sensor device is further programmed to transmit one or both of the first data point and the first dataset to the thermostat.

In one or more optional embodiments, a user device is in data communication with the wireless network interface controller, wherein the user device is connected to the wireless local network or to the server, and the sensor device is further programmed to receive a command from the user device, the command comprising one or both of a configuration and a firmware update. As a further option, the command further comprises the wake command. As yet another option, the first dataset further comprises one or more of a unique sensor device name, a sensor device location, a data point collection time, a temperature data point, a humidity data point, a light intensity data point, a light detection data point, a motion detection data point, a leak detection data point, a sound detection data point. In another optional embodiment, the sensor comprises one or more of a temperature sensor, a humidity sensor, a light sensor, a leak sensor, a sound sensor, and a motion sensor.

In one or more optional embodiments, the sensor device is further programmed to perform a firmware update check during the active mode when in data communication with the server, wherein the frequency of the firmware update check is determined by one or both of a firmware update interval and an update command received from the server or a user device.

The present disclosed subject matter solves the problems described above by providing, in some embodiments, a method for lowering power consumption in a sensor device, the method comprising the steps of providing the sensor device comprising a sensor, a battery power source, a wireless network interface controller, a memory, and a hardware processor; maintaining a connection between the wireless network interface controller and a wireless local network in both a low power mode and an active mode; maintaining the low power mode until a wake command is received, wherein the sensor, memory, and the hardware processor are configured to be transitioned from the low power mode to the active mode upon receipt of the wake command; receiving the wake command; transitioning to the active mode; performing a first data acquisition cycle, the first data acquisition cycle comprising the steps of: measuring, by the sensor, the local environmental condition; and writing, to the memory, a first data point within a first dataset, first data point associated with a first measurement of the local environmental condition; receiving a low power command, wherein the sensor, memory, and the hardware processor transition from the active mode to the low power mode; receiving the wake command; transitioning to the active mode, wherein in the active mode, the wireless network interface controller is in data communication with the server; communicating the first dataset to a server and writing the first dataset to a main dataset stored in a database associated with the server; receiving the low power command; and transitioning to low power mode.

In one or more optional embodiments, after measuring the first data point and before receiving the wake command immediately prior to communicating first dataset to the server, the steps further comprise receiving the wake command upon the elapse of an acquisition time interval, the acquisition time interval governing the time between each data acquisition cycle, the data acquisition cycle comprising transitioning from the low power mode to the active mode where data is collected and stored and back to the low power mode, and wherein the elapse of the acquisition time interval triggers the wake command; transitioning to the active mode; performing a second data acquisition cycle, the second data acquisition cycle comprising the steps of: measuring, by the sensor, the local environmental condition; writing, to the memory, a second data point within the first dataset, first data point associated with a first measurement of the local environmental condition; receiving the low power command; transitioning to the low power mode; and remaining in the low power mode until one or both the elapse of the acquisition time interval and the receipt of the wake command unrelated to the acquisition time interval.

In one or more optional embodiments, the steps further comprise performing a plurality of data acquisition cycles to acquire and write to the memory a plurality of data points to a second dataset. Also, in one or more optional embodiments, the steps further comprise receiving the wake command upon the elapse of a transmit time interval, the transmit time interval governing the time between each data transmit cycle, wherein the elapse of the acquisition time interval triggers the wake command; communicating the second dataset to the server and writing the second dataset to a main dataset recorded in the database associated with the server; receiving the low power command; and transitioning to low power mode. Additionally, in one or more optional embodiments, the wake command is triggered by one or more of the elapse of a time period and a command received from an external source via the wireless network interface controller. Further, in one or more optional embodiments, the low power mode configurable as one or more of a sleep mode, a standby mode, a low power run mode, a low power sleep mode, and a stop mode. In one or more optional embodiments, a thermostat is connected to the wireless local network, and the steps further comprise transmitting one or both of the first data point and the first dataset to the thermostat.

In one or more optional embodiments, a user device is in data communication with the wireless network interface controller, and the steps further comprise connecting the user device to the sensor device through the wireless local network or to the server; and receiving a command, from the user device, the command comprising one or both of a configuration and a firmware update. Additionally, in one or more optional embodiments, the command further comprises the wake command. Further, in one or more optional embodiments, the first dataset further comprises one or more of a unique sensor device name, a sensor device location, a data point collection time, a temperature data point, and a humidity data point. Also, in one or more optional embodiments, the sensor comprises one or both of a temperature sensor and a humidity sensor.

In one or more optional embodiments, the steps further comprise performing a firmware update check during the active mode when in data communication with the server, wherein the frequency of the firmware update check is determined by one or both of a firmware update interval and an update command received from the server or a user device.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

In some embodiments, the present device, system and methods provides tools for measuring, recording local environmental conditions (e.g., the physical properties of the environment, including the atmospheric conditions and other surrounding conditions), and wirelessly transmitting the collected data to a server. Although specific examples of sensors are illustrated herein, such as temperature and humidity, the present device is not limited to the exemplary sensors, and can include any appropriate sensor capable of measuring desired physical property of the surrounding environment. The present sensor device is compact in size and powered by a battery power source (e.g., a lithium-ion battery, a dry cell battery, and the like, for example, two disposable or rechargeable AA or AAA batteries may be used, depending on the power and space requirements of the application and/or the sensor device). The sensor device further includes a sensor that measures local environmental conditions, such as temperature, humidity, moisture (e.g., detection of the presence of water due to a leak), light, sound motion (and/or other measurable conditions, appropriate for the application), a wireless network interface controller (e.g., a Wi-Fi chipset and/or module, a BLUETOOTH chipset and/or modules, and/or other communications interface appropriate for the application), a memory, and a hardware processor for executing the firmware and/or software to operate the sensor device within the system.

In some embodiments, the sensor device is configured to, under normal operation, maintain the connection between the wireless network interface controller and the wireless local network so that various commands and/or communications can be received, whether the sensor device is in a low power mode or in an active mode. The sensor device cycles between the low power mode (which is, in one or more embodiments, the normal mode of operation) and the active mode, and back to the low power mode. In some embodiments, the sensor device is configured with an acquisition time interval, which determines the time period(s) between successive active modes in which the sensor measures the local environmental conditions at a given sensor position and at a given time (measured in seconds or in clock time, etc.) and records the data in the memory. Further, in some embodiments, the sensor device is configured with a transmit time interval, which determines the time period(s) between successive active modes in which the collected data is transmitted to the server for long term storage and to provide access to recent and/or historical data from a client device, such as a smartphone, a tablet, a laptop, or other electronic device which can establish communication with the server. Moreover, in some embodiments, the sensor device is configured with a firmware update interval, which determines the time period(s) between successive active modes in which a firmware update check is performed by the sensor device with one or both the user device and the server.

Of course, in some embodiments, instead of a time period being individually set for each of the acquisition time interval, the transmit time interval, and the firmware update interval, the time periods may be derived from one of the time intervals. For example, the transmit time interval is configured to occur every n acquisition time intervals (where n can be any number, e.g., 10, 20, 30, and so on) and/or the firmware update interval is configured to occur every n' acquisition time intervals (where n' can be any number, e.g., 1440, 2880, and so on) and/or the firmware update interval is configured to occur every n" transmit time intervals (where n" can be any number, e.g., 288, 144, and so on). Additionally, in a single active mode occurrence, one or more functions may be carried out, such as one or more of a sensor measurement, a data transmission, an update check, and other pending command that has been queued in the server and/or the user device (or other client computer).

Figure 1:
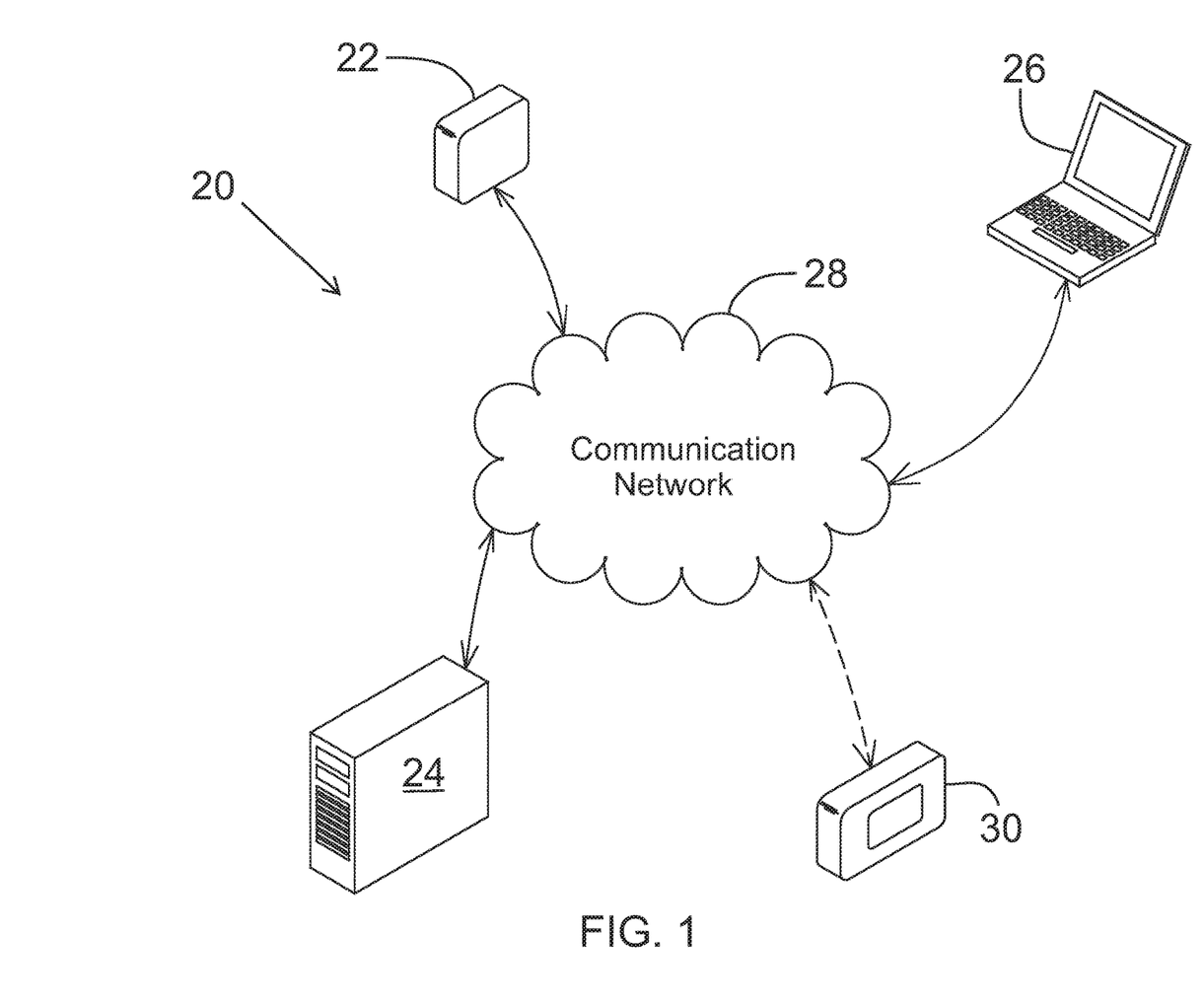
FIG. 1 shows a schematic diagram of an illustrative system suitable for implementation of mechanisms described herein for conserving power in a sensor device that measures and records local environmental conditions and wirelessly transmits the collected data to a server in accordance with some embodiments of the disclosed subject matter.

Turning to FIG. 1, an example network or system 20 of hardware for measuring, recording local environmental conditions, and wirelessly transmitting the collected data that can be used in accordance with some embodiments of the disclosed subject matter is shown. As illustrated, the hardware can include a sensor device 22, one or more servers 24, one or more user devices 26, and/or an optional thermostat, which can be omitted in one or more embodiments.

Computer networks are well known in the art, often having one or more IoT devices (such as the present sensor device 22) one or more user devices and one or more servers, on which any of the methods and systems of various disclosed embodiments may be implemented. In particular one or more the sensor device 22, the server 24, and/or the user device 26 may represent any of the computer systems and physical components necessary to perform the computerized methods discussed in connection with the present figures and, in particular, may represent a server (cloud, array, etc.), client, or other computer system upon which e-commerce servers, websites, databases, web browsers and/or web analytic applications may be instantiated.

The optional illustrated exemplary server 24 and user device 26 are generally known to a person of ordinary skill in the art, and each may include a processor, a bus for communicating information, a main memory coupled to the bus for storing information and instructions to be executed by the processor and for storing temporary variables or other intermediate information during the execution of instructions by processor, a static storage device or other non-transitory computer readable medium for storing static information and instructions for the processor, and a storage device, such as a hard disk, may also be provided and coupled to the bus for storing information and instructions. The server 24 and user device 26 may optionally be coupled to a display for displaying information. However, in the case of the server 24, such a display may not be present and all administration of the server may be via remote clients. Further, the server 24 and user device 26 may optionally include connection to an input device for communicating information and command selections to the processor, such as a keyboard, mouse, touchpad, microphone, and the like.

Any suitable computer readable media can be used for storing instructions for performing the present functions and/or processes. For example, computer readable media can be transitory or non-transitory. Non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory, electrically erasable programmable read-only memory, and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 2:
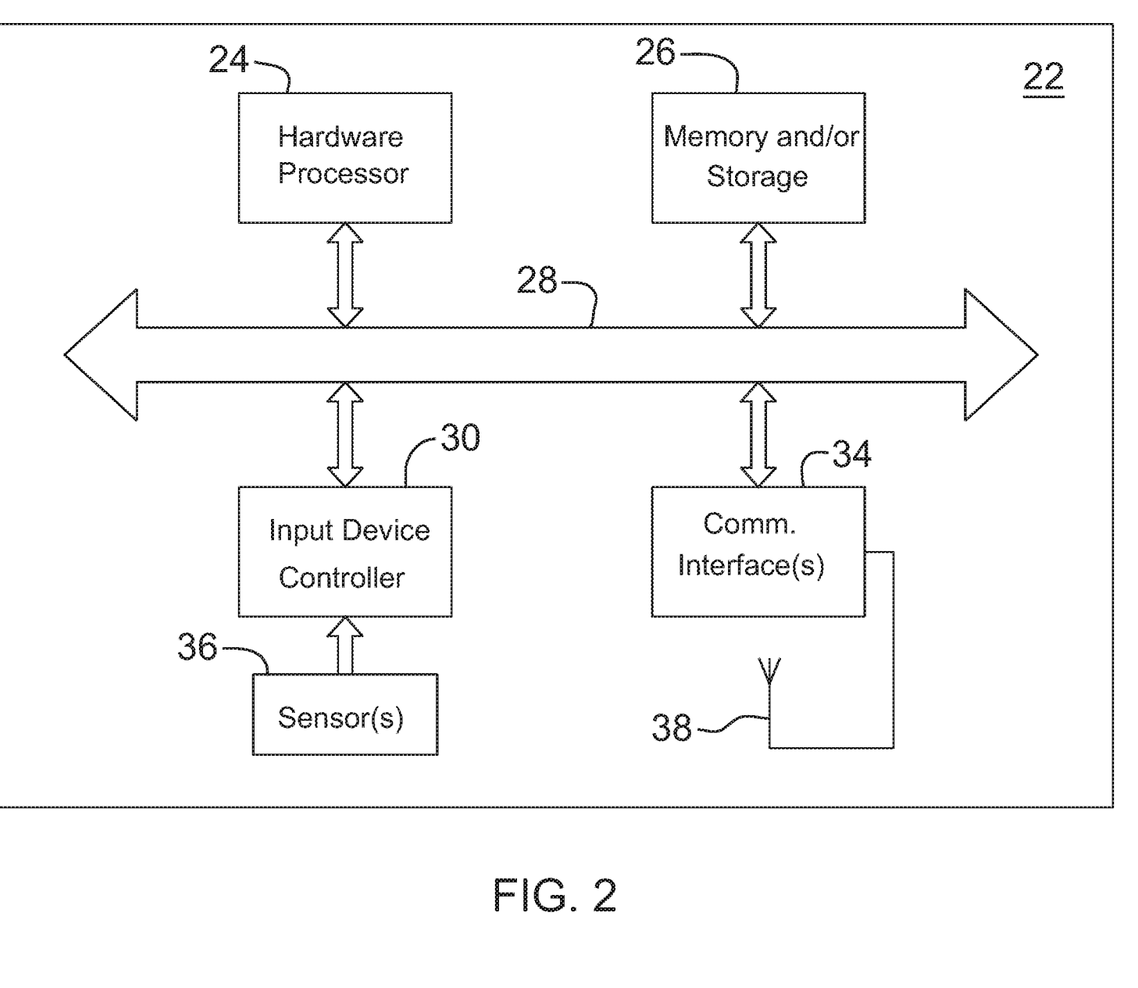
FIG. 2 shows a schematic example of a sensor device that can be used in the system of FIG. 1 in accordance with some embodiments of the disclosed subject matter.

Looking also at FIG. 2, the sensor device 22 is schematically illustrated and comprises a hardware processor 24 a bus 28 for communicating information, memory 26 coupled to the bus 28 for storing information and instructions to be executed by the processor 24 and for storing temporary variables or other intermediate information during the execution of instructions by the processor 24, an input device controller 30 in data communication with one or more sensors 36, and a communications interface 34 coupled to an antenna 38. The sensor 36 can be any number of sensors, including but not limited to temperature sensors, humidity sensors, carbon dioxide sensors, oxygen sensors, carbon monoxide sensors, light intensity and detection sensors, leak detection sensors, sound sensor, motion sensor, or any other appropriate sensor that detects and measures local environmental conditions (e.g., analytical measurements) so that the measurement data can transmitted to a server or other computing means for storage and/or further analysis and/or computations.

In some embodiments, the sensors may be analog or digital, where an analog sensor interface signal is converted to digital with an optional analog to digital converter. Although, this is generally unnecessary, due to the ability to select digital sensors in most, if not all, cases. In one example, a temperature sensor (e.g., a thermistor, a thermocouple, a resistance temperature detector, an integrated circuit temperature sensor, or other appropriate temperature sensor) produces a digital signal in response to a temperature sensed within or outside the enclosure of the sensor device 22 (where vents at strategic portions of the enclosure permit air to enter and come into detectible range of the sensor). The signal also may be converted to the appropriate digital signal by a conditioning chip.

In some embodiments, for each measurement acquired through the sensor, a data point is saved in memory within a dataset. As the memory within the sensor device 22 is limited, prior datasets are permitted to be overwritten once those datasets have been uploaded to the server. The data points are stored in dataset files (e.g., a tab-delimited text format or other appropriate file format which may be standard or proprietary format), generally, as numbers which can represent a voltage or current reading or may be converted by the hardware processor 24 to a temperature reading and/or a humidity reading, etc., which are stored as data points within the dataset. Generally, the conversion occurs remotely, within the server 24 or the user device 26, as power processor consumption is not an issue. The user device 26 presents the data within a graphical user interface, with the option of displaying the current detected temperature, the set temperature, historic temperatures (e.g., in a line graph or other easily understood graphical or numeric manner appropriate for quick communication of the multiple points of data).

The graphical user interface (not illustrated, although it can be installed as an "app" on a smartphone and/or a standard software application installed on a laptop, desktop, or other computing device) provides, in some embodiments, the ability to update the firmware or update/change any one of the settings on the sensor device (e.g., a push update, or similar command). The user device 26 can be directly connected to the sensor device 22 (e.g., via a wireless BLUETOOTH connection or the like, connected through a common wireless access point or network, through a secure internet connection, and/or a wired data connection, or other appropriate connection means) or connected through the server 24. Access to long-term historic data is only being permitted through connection to the server 24, in some embodiments. After the firmware update is received by the sensor device (either from a command received from the user device 26 and/or the server 24 or from a scheduled update check performed by the sensor device 22), the sensor device installs the update and restarts, if necessary.

It should be noted that communication between the sensor device 22, the server 24, and user device 30 (and, optionally, the thermostat 30) may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the servers and devices are intended to include any type of computing or electronic device now known or later developed, such as desktop computers, mobile phones, smartphones, laptop computers, tablet computers, virtual reality systems, personal data assistants, gaming devices, POS systems, vending machines, unattended terminals, access control devices, point of interaction ("POI") systems, etc.

The communication interface 34 is coupled to the bus, for providing two-way, wired and/or wireless data communication to and from the server and/or client computers. For example, the communications interface may send and receive signals via a local area network, public network, intranet, private network (e.g., a VPN), or other network, including the Internet.

In the present illustrated example, the hard drive of the server 24 (including optional third party servers and/or mobile app backend service, and the like) and/or the user device 26 and/or the sensor device 22 can be encoded with executable instructions, that when executed by a processor cause the processor to perform acts as described in the methods of the figures and description. The server 24 communicates through the Internet, intranet, or other network with the user device 26 to cause information and/or graphics to be displayed on the screen (display of the user device or other screen associated with any part of the system 20), such as HTML code, text, images, and the like, sound to be emitted from the speakers, etc. The server 24 may host a URL site with information and media, which may be accessed by the user device 26. Information transmitted to the server 24 (such as temperature and humidity data) may be stored and manipulated according to the methods described below, using the software encoded on one or more of the sensor device 22, the server 24, and the user device 26. Although the computing devices are illustrated schematically, the computing devices may include laptops, desktops, tablets, cellular devices (e.g., smart phones, such as iOS devices, ANDROID devices, WINDOWS devices, and the like), or any other computing device now known or later developed.

Still looking at FIG. 1, the user devices 26 may be one of many available computing devices capable of running executable programs and/or a browser instance. For example, it may be a mobile device, such as a tablet computer or a mobile phone device with computer capabilities, a laptop, a desktop, or other computing device. Executable instructions for the present method may be installed on one or more of the sensor device 22, the server 24, and the user device 26 that hosts a web application caused to display a graphical user interface on the user device 26. In some example embodiments, the user device 26 accesses and interact with the graphical user interface through a web browser instance, such as FIREFOX, CHROME, SAFARI, INTERNET EXPLORER, and the like, or through a desktop application or other application. The web application is hosted on a server with application hosting capabilities. In some example embodiments, the user device 26 can access and interact with the graphical user interface through either a web application running on a mobile web browser or a mobile application (commonly called an "app").

In the illustrated embodiment of FIG. 1, the server 24 shown as a single device, however the functions performed by the server 24 can be performed using any suitable number of devices in one or more example embodiments. Further, in one or more example embodiments, multiple devices can be used to implement the functions performed by the server 24. Likewise, in one or more example embodiments, the user device 26 may be any number of suitable devices to accommodate access by multiple users.

Still referring to FIG. 1, in some embodiments, the system 20 further comprises a plurality of sensor devices 22, each of which can include one or more sensors which are different from of similar to the sensors of the other sensors devices 22 of the system 20. In some configurations, multiple sensor devices in the same general area are connected to the same access point or are on the same network. In one example system 20, a first group of sensor devices 22 are connected to a first wireless access point and a second group of sensor devices 22 are connected to a second wireless access point, with the first wireless access point and the second wireless access point being connected to the same router or intranet or other suitable network. Each of the sensor devices should be capable of radio communications with the associated access point or other point of internet connection, such as through a Wi-Fi signal. Each of the sensor devices associated with the first wireless access point are capable of individually maintaining a connection to the first wireless access point for the purpose of waking and transmitting data to the server 24.

In some embodiments, because there are multiple sensor devices associated with first wireless access point, each should be uniquely named to, at least, distinguish each from the other in a group or to universally distinguish each from any other similar sensor device in the product line. Unique names within a group of sensor devices 22 can be established by a preset name or a later assigned named. In one example sensor device 22, a series of dip switches which can be used to manually assign a sensor device number to each sensor within a small group of sensor devices (e.g., less than 10 or 20 sensor devices within the group). In this way, when the dataset for each of the individually named sensor device 22 within the first group is uploaded to the server 22 database, the name, optionally, the group name of each sensor device is associated with the data acquired and uploaded by that sensor device. Thus, each sensor device can be individually tracked and associated with a particular location within a facility (e.g., the dataset contains information that permits the software in the server 24 and/or the user device 26 to label the data with the location name, such as "Room 2258" or other conventional naming convention that is understandable by the layman or the person expected to read the location name). This location name can be presented as part of the graphical user interface, perhaps even using an image of a map with the location highlighted or similar visual effect.

As discussed above, the present system 20 supports the energy efficient operation of the sensor device 22 therein, by permitting the sensor device 22 to enter a low power mode while maintaining a connection with the local access point (or other local point of connection) even in low power mode. In some embodiments, many or all of the non-radio (e.g., not necessary for radio communications) components and/or peripherals of the sensor device 22 are placed in low power mode. Depending on the design of the circuitry, software, and other requirements of the sensor device, the non-radio components and/or peripherals are placed in low power mode, while the wireless network interface controller (e.g., a Wi-Fi module, Wi-Fi card, or other appropriate wireless controller) and any circuitry necessary for its function is kept in the active mode. Low power mode can include any range of reduced power consumption, compared to the active mode (e.g., fully powered), including a sleep mode, a standby mode, a low power run mode, a low power sleep mode, and a stop mode. In some embodiments, one or more components and/or peripherals may be placed in differing low power modes (e.g., one component can be placed in stop mode, while another component is placed in sleep mode, or other appropriate combinations according to the design requirements).

In some embodiments low power mode is the default state, until a wake command and/or event is received and/or generated. For example, in some embodiments, an internal timekeeping means (e.g., a real-time clock-calendar or the like) can wake the components in low power mode at a predetermined or user-configured interval to permit a pending function and/or command to be performed during the active mode. After the one or more functions and/or commands have been executed or after a set time period of active mode has elapsed, the woken components will return to the low power mode until the next wake command and/or event is received and/or generated. This cycle of waking one or more components necessary to perform a command, and then, placing one or more components to low power mode when not necessary, while keeping the wireless network interface controller sufficiently active and powered to consistently remain in data communication with at least part of the network (e.g., the wireless access point or the like, using a TLS connection) continues indefinitely, unless configured otherwise. In some embodiments, transport layer security (TLS) is used for mutual authentication (server and client side) or one way (server side only).

Of course, if the wireless network interface controller becomes disconnected from the access point inadvertently, attempts to reconnect will be made periodically. An error code can be generated if the server has not been in data communication with one or more sensor devices 22 for a predetermined period of time or attempts. If one sensor device in a group of sensor devices, connected to the same access point or network is off line, one assumption could be that a particular sensor device requires servicing (e.g., replace dead batteries, replace components, or replace entire unit, or other appropriate measure which can be determined by a trained technician). If the entire group of sensor devices is off line, one assumption could be that there is a network and/or power issue with the network devices. In either case, if data communication is lost for a predetermined period of time, an alert can be sent to the appropriate persons (e.g., appearing as an alert in the graphical user interface).

As briefly discussed above, the sensor device 22 is cycled between an active mode and a low power mode for various purposes, for example, to acquire and save one or more sensor readings, to upload data to the server, to check for firmware updates, and/or to execute other appropriate instructions pending. Once in the sensor device 22 is in the active mode within a particular cycle, several functions can be carried out within that cycle, before once again transitioning into low power mode once again. The time between cycles (of any sort) can be measured by various methods, for example, the acquisition time interval (e.g., the amount of time between two successive measurement cycles with at least one low power mode enacted between) can be measured from the receipt of a first wake command to the receipt of the second wake command for the purposes of acquiring and saving one or more sensor readings or the time between two measurements or the time between any two points specified in the firmware, by the server, or by the user. The time interval may be set to, for example, every 30 seconds, every 1 minute, every 90 seconds, or any other desired time interval.

Looking at the transmit time interval (e.g., the amount of time between two successive transmit cycles with at least one low power mode enacted between, usually a plurality of low power modes), the time interval can be set to a long interval to save energy or to a short interval if the user desires more up-to-the-minute data to be available on the server 24 or to an interval between short and long to balance the need for current data on the server 24 and the need to conserve battery life in the sensor device. The transmit time interval can be predetermined (e.g., preset within the firmware) and/or configurable by the end user. The time interval may be set to, for example, every 5 minutes, every 10 minutes, every 15 minutes, every 30 minutes, every 60 minutes, or any other desired time interval. The long the interval, the longer the battery life, which can vary from less than one year battery life for the most frequent time intervals to over seven years for less frequent time intervals. Depending on the configurations, the system design, and the time interval, the battery may last more than eleven years. Alternatively, the transmit time interval can be derived from the acquisition time interval. For example, for a 1 minute acquisition time interval, the sensor device 22 can be instructed to transmit the sensor data, the sensor device name, and/or other pertinent data every 60 acquisition time interval cycles (e.g., 60 data acquisition cycles, where 60 data points have been collected from a single sensor, such as the temperature sensor). The dataset (e.g., the payload, which includes sends historical data collected since the last transmission) is uploaded to the server at each transmit interval. If a transmission is interrupted or missed, sending the historical data collected since the last transmission with the last sensor reading allows data correction and/or recovery of interrupted or missing data in the time series data storage.

Looking at the update time interval (e.g., the amount of time between two successive update cycles where a firmware update check can be completed with at least one low power mode enacted between, usually a multiplicity of low power modes). The update time interval should be the least frequent, as updates are generally infrequent. Generally, the firmware update check (where the sensor device checks for update commands on the server) should not be an event separate from data transmission. Thus, the update time interval can be set as a specific time interval, such as every 24 hours, or the acquisition time interval can be derived from the transmit time interval. For example, the sensor device 22 can be instructed to conduct an update check every 3,600 transmit time interval cycles. In this way, the update check does not require substantial additional energy usage.

Figure 3:
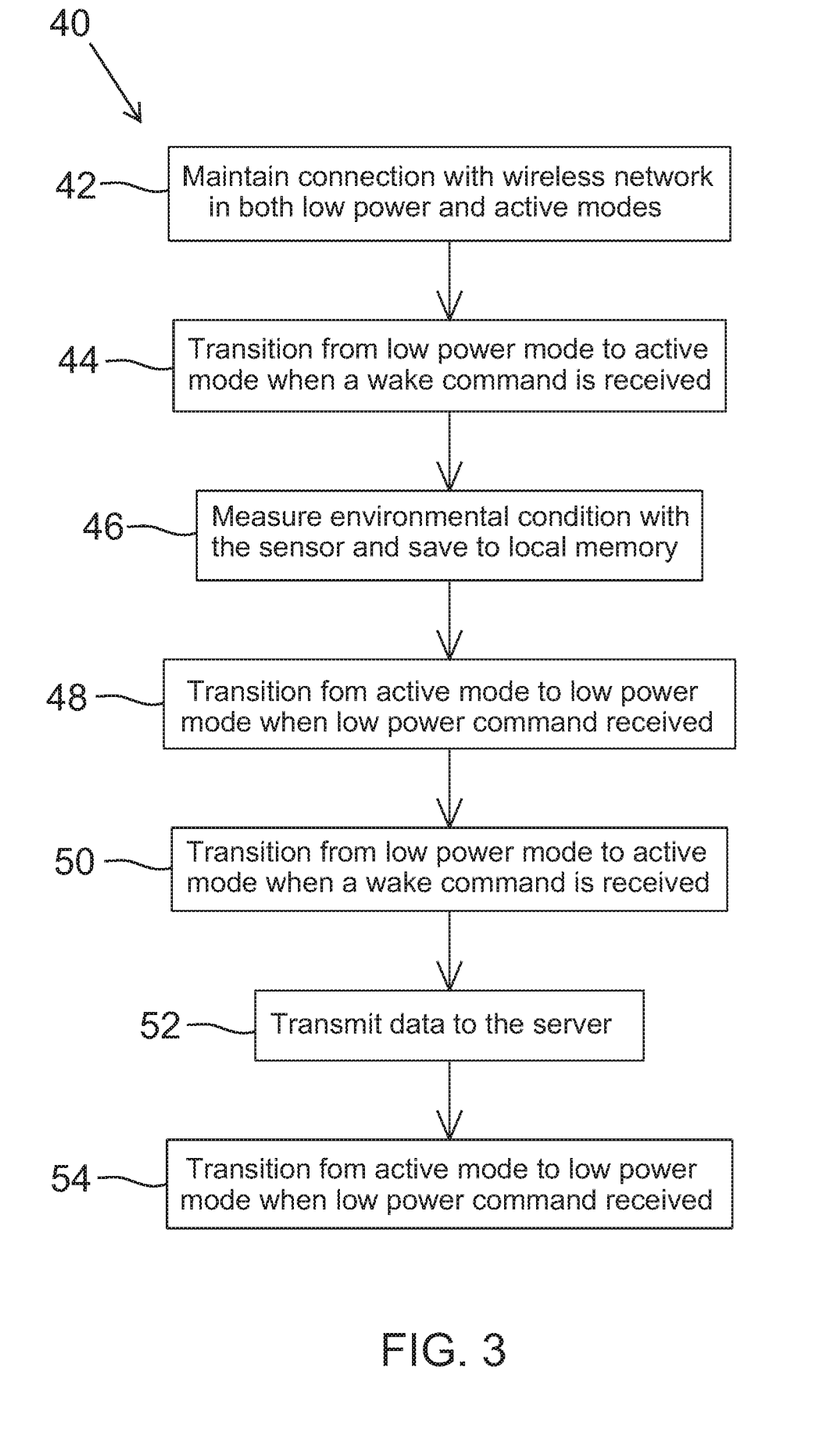
FIG. 3 shows an example of a process for measuring and recording local environmental conditions, and wirelessly transmitting the collected data to the server is shown in accordance with some embodiments of the disclosed subject matter.

Turning to FIG. 3, an example of a process 40 for measuring and recording local environmental conditions, and wirelessly transmitting the collected data to the server is shown in accordance with some embodiments of the disclosed subject matter. The process includes the steps of maintaining a connection with a local wireless network at substantially all times, in both low power mode and active mode at 42. Of course, there may be times of disconnection due to various technical difficulties (e.g., disconnection from the Internet and/or local intranet, power issues, maintenance, etc.); however, the device 22, if possible, can, in some embodiments, periodically attempts to reconnect to the network and/or produces data or lack of data to alert of an outage. Thus, the connection is maintained ideally 100% of the time, but may be maintained up to 99% of the time, or up to 98% of the time, or up to 95% of the time, and so on. The device 22 is transitioned from a low power mode to an active mode upon receiving a wake command at 44. When in the active mode, the sensor(s) measures one or more environmental conditions; and that data is saved to the device memory at 46. After a low power command is received, the device transitions from the active mode to the low power mode, again, maintaining a connection with the network at 48. The device 22 is transitioned from a low power mode to an active mode upon receiving a wake command at 50. Sensor data that has been collected and saved to memory is transmitted to the server 24 and saved to the database at 52. After a low power command is received, the device transitions from the active mode to the low power mode, again, maintaining a connection with the network at 54.

Figure 4:
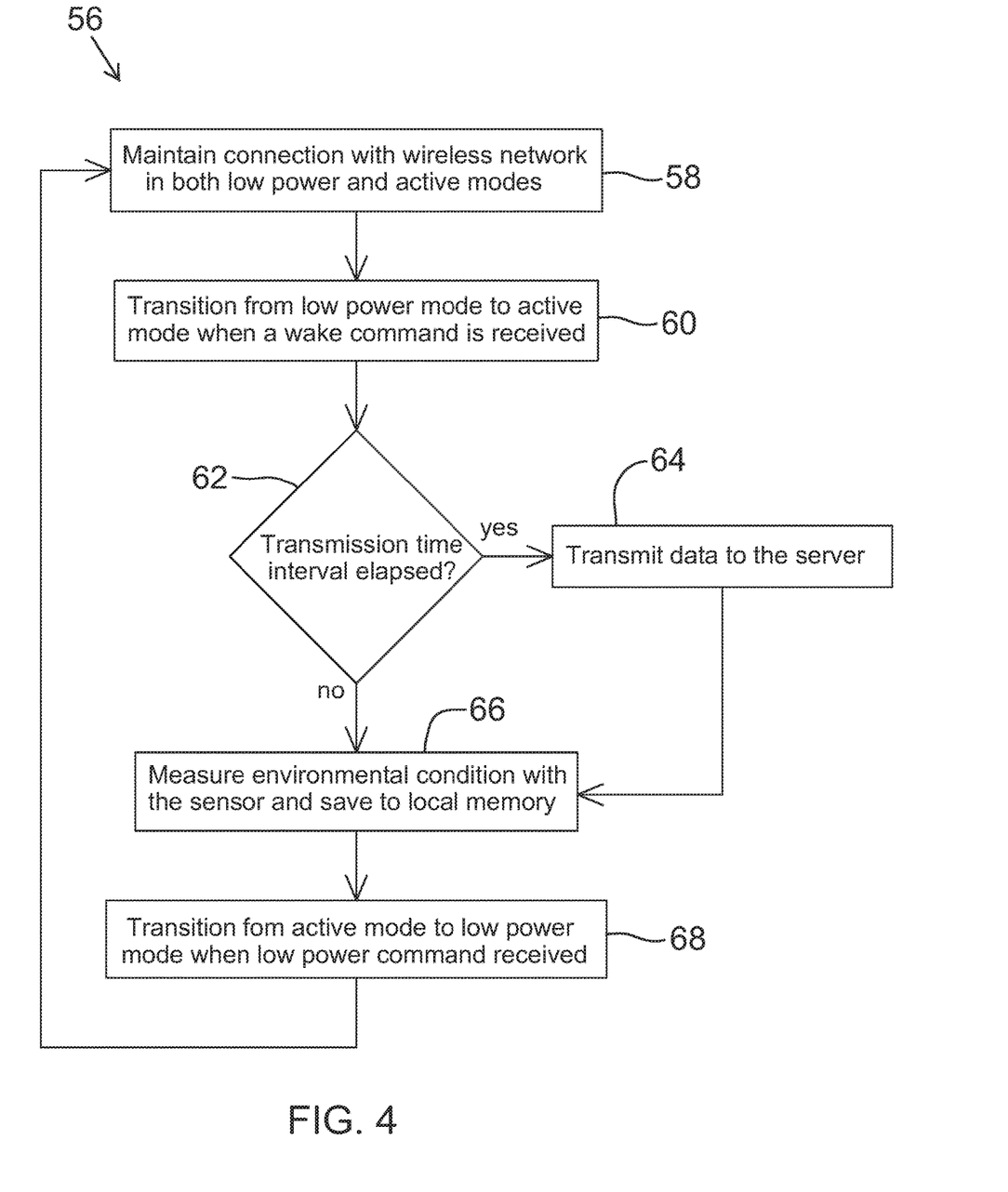
FIG. 4 shows an example of a process for measuring and recording local environmental conditions, and wirelessly transmitting the collected data to the server is shown in accordance with some embodiments of the disclosed subject matter.

Turning to FIG. 4, an example of a process 56 for measuring and recording local environmental conditions, and wirelessly transmitting the collected data to the server is shown in accordance with some embodiments of the disclosed subject matter. The example process 56 illustrates the repeated cycle of transitioning between the active mode and the low power mode in order to save power, where the active mode is initiated for the execution of specific tasks. The process includes the steps of maintaining a connection with a local wireless network at substantially all times, in both low power mode and active mode at 58. The device 22 is transitioned from a low power mode to an active mode upon receiving a wake command at 60. In this example process 56, the device 22 receives a wake command at regular short intervals (e.g., every 1 minute, every 2 minutes, or other appropriate time interval) for the purpose of measuring one or more environmental conditions. While the device 22 is in the active mode, it is determined whether the transmission time interval has elapsed (e.g., if, for example, a 24 hour time interval has elapsed since the last transmission of data to the server, which may be measured in the number of data acquisition cycles or by clock time or by other appropriate cyclic means) at 62. If the transmission time interval has elapsed, sensor data that has been collected and saved to memory is transmitted to the server 24 and saved to the database at 64. Whether or not the transmission time interval has elapsed, the sensor(s) measures one or more environmental conditions; and that data is saved to the device memory at 66. The order of transmitting data to the server and measuring environmental conditions is generally unimportant, and may be switched. After a low power command is received, the device transitions from the active mode to the low power mode, again, maintaining a connection with the network at 68. Thereafter, the connection with a local wireless network is maintained at 58, and the cycle is repeated.

EXAMPLES

Below are several example options for the configuration and operation of the present sensor device 22 and system 20.

In a first example setup, the sensor device 22 is caused to fast reconnect from sleep utilizing TCP Tx and Rx ACK; provisioning (in SoftAP mode) by a mobile app and reboot; and save sensor name and transmission interval. After provisioning, connect to access point and establish a secure connection to the server 24 and save the current date and time. Schedule the timer for periodic (normal) operation. Wake up, and read and save sensor readings with timestamp, then sleep for 1 minute. If the transmission interval is reached, then send TCP UC encrypted using TLS with payload of historical sensor readings, and wait for TCP ACK. Check for firmware upgrade every 24 hours, and download/reboot if there is a new firmware. Repeat the periodic operation.

In a second example setup, the sensor device is caused to fast reconnect from Sleep utilizing UDP Tx only; provisioning (in SoftAP mode) by a mobile app and reboot; and save sensor name and transmission interval. After provisioning, connect to access point and establish a secure connection to the server 24 and save the current date and time. Schedule timer for periodic (normal) operation. Wake up, and read and save sensor readings with timestamp, then sleep for 1 minute. If the transmission interval is reached, send UDP UC encrypted using DTLS with payload of historical sensor readings. Check for firmware upgrade every 24 hours, and download/reboot if there is a new firmware. Repeat the periodic operation.

In a third example setup, the sensor device 22 is caused to fast reconnect from Sleep utilizing UDP Tx and Rx Ack w/CoAP; provisioning (in SoftAP mode) by a mobile app and reboot; and save sensor name and transmission interval. After provisioning, connect to access point and establish a secure connection to the server 24 and save the current date and time. Schedule timer for periodic (normal) operation. Wake up, and read and save sensor readings with timestamp, then sleep for 1 minute. If the transmission interval is reached, then send UDP UC encrypted via DTLS with payload of historical sensor readings, and wait for UDP Response encrypted via DTLS. Check for firmware upgrade every 24 hours, and download and reboot if there is a new firmware. Repeat the periodic operation.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as "comprise" and "comprises", and equivalent open-ended transitional phrases thereof like "including," "containing" and "having", encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

What is claimed is:

1. A sensor device configured to connect to a wireless local network and measure a local environmental condition, the sensor device comprising:
   a sensor configured to measure the local environmental condition;
   a memory;
   a wireless network interface controller; and
   a hardware processor that, when executing computer executable instructions stored in the memory, is programmed to:
   maintain a connection between the wireless network interface controller and the wireless local network in both a low power mode and an active mode;
   maintain the low power mode until first wake command is received from a remote server, wherein the sensor, the memory, and the hardware processor are configured to be transitioned from the low power mode to the active mode;
   receive the first wake command from the remote server, wherein, in the active mode, the sensor measures the local environmental condition to collect a first data point and writes the first data point within a first dataset recorded in the memory;
   receive a low power command, wherein the sensor, the memory, and the hardware processor transition from the active mode to the low power mode after collecting the first data point;
   receive a second wake command from the remote server, wherein the second wake command is triggered upon elapse of an acquisition time interval, wherein the acquisition time interval governs the time between each data acquisition cycle, wherein, in the active mode, the wireless network interface controller is in data communication with the remote server;

determine a transmit time by the hardware processor based on the acquisition time interval, the transmit time determined by an elapsed time since an immediately prior transmission of data to the remote server;
determine if the transmit time exceeds a transmit time interval by the hardware processor;
if the transmit time exceeds the transmit time interval, transmit the first dataset to the remote server;
subsequent to transmitting the first dataset to the remote server, receive a second low power command; and
transition to the low power mode after receiving the second low power command.

2. The sensor device of claim 1 further comprising a battery power source providing power to the sensor, the memory, the wireless network interface controller, and the hardware processor.

3. The sensor device of claim 1 wherein, after the first data point is collected and before the second wake command is received immediately prior to the first dataset being transmitted to the remote server, the hardware processor is further programmed to:
detect the local environmental condition by the sensor;
write a second data point within the first data set recorded in the memory;
receive the low power command; and
transition to the low power mode, until one or both the elapse of the acquisition time interval and a receipt of a wake command unrelated to the acquisition time interval.

4. The sensor device of claim 3 wherein, after the dataset is transmitted to the remote server and the low power command is received thereafter, the hardware processor is further programmed to:
write a plurality of data points to the memory, the plurality of data points being collected while in the active mode by the sensor and written within a second dataset recorded in the memory over the course of a plurality of data acquisition cycles.

5. The sensor device of claim 4 wherein, the hardware processor is further programmed to:
receive a third wake command upon the elapse of the transmit time interval, the transmit time interval governing the time between each data transmit cycle; and
transmit the second dataset to the remote server and write the second dataset to the main dataset recorded in the database associated with the remote server.

6. The sensor device of claim 1 wherein the second wake command is triggered by one or more of the elapse of a time period and a command received from an external source via the wireless network interface controller.

7. The sensor device of claim 1 wherein the low power mode is configurable as one or more of a sleep mode, a standby mode, a low power run mode, a low power sleep mode, and a stop mode.

8. The sensor device of claim 1 wherein a thermostat is connected to the wireless local network, the hardware processor is further programmed to:
transmit one or both of the first data point and the first dataset to the thermostat.

9. The sensor device of claim 1 wherein a user device is in data communication with the wireless network interface controller, wherein the user device is connected to the wireless local network or to the remote server, the hardware processor is further programmed to:
receive a command from the user device, the command comprising one or both of a configuration and a firmware update.

10. The sensor device of claim 9 wherein the command further comprises the second wake command.

11. The sensor device of claim 1 wherein the first dataset further comprises one or more of a unique sensor device name, a sensor device location, a data point collection time, a temperature data point, a light intensity data point, a light detection data point, a motion detection data point, a leak detection data point, a sound detection data point, and a humidity data point.

12. The sensor device of claim 1 wherein the sensor comprises one or more of a temperature sensor, a humidity sensor, a light sensor, a leak sensor, a sound sensor, and a motion sensor.

13. The sensor device of claim 1, the hardware processor is further programmed to:
perform a firmware update check during the active mode when in data communication with the remote server, wherein the frequency of the firmware update check is determined by one or both of a firmware update interval and an update command received from the remote server or a user device.

14. A method for lowering power consumption in a sensor device, the method comprising the steps of:
providing the sensor device comprising a sensor, a battery power source, a wireless network interface controller, a memory, and a hardware processor;
maintaining a connection between the wireless network interface controller and a wireless local network in both a low power mode and an active mode;
maintaining the low power mode until first wake command is received, wherein the sensor, the memory, and the hardware processor are configured to be transitioned from the low power mode to the active mode upon receipt of the wake command;
receiving the first wake command from a remote server;
transitioning to the active mode;
performing a first data acquisition cycle, the first data acquisition cycle comprising the steps of:
measuring, by the sensor, a local environmental condition to collect a first data point; and
writing, to the memory, the first data point within a first dataset, the first data point associated with a first measurement of the local environmental condition;
receiving a low power command, wherein the sensor, the memory, and the hardware processor transition from the active mode to the low power mode after collecting the first data point;
receiving a second wake command from the remote server wherein the second wake command is triggered upon elapse of an acquisition time interval, wherein the acquisition time interval governs the time between each data acquisition cycle;
transitioning to the active mode, wherein in the active mode, the wireless network interface controller is in data communication with the remote server;
determining a transmit time by the hardware processor based on the acquisition time interval, the transmit time determined by an elapsed time since an immediately prior transmission of data to the remote server;
determining that the transmit time exceeds a transmit time interval by the hardware processor;
responsive to determining that the transmit time exceeds the transmit time interval, transmitting the first dataset to the remote server;

subsequent to transmitting the first dataset to the remote server, receiving the second low power command; and transitioning to low power mode after receiving the second low power command.

15. The method of claim 14 wherein, after measuring the first data point and before receiving the second wake command immediately prior to communicating first dataset to the remote server, the steps further comprising:

transitioning to the active mode;

performing a second data acquisition cycle, the second data acquisition cycle comprising the steps of:

measuring, by the sensor, the local environmental condition;

writing, to the memory, a second data point within the first dataset, the first data point associated with the first measurement of the local environmental condition;

receiving the low power command;

transitioning to the low power mode; and remaining in the low power mode until one or both the elapse of the acquisition time interval and a receipt of a wake command unrelated to the acquisition time interval.

16. The method of claim 15, the steps further comprising:

performing a plurality of data acquisition cycles to acquire and write to the memory a plurality of data points to a second dataset.

17. The method of claim 16, the steps further comprising:

receiving a third wake command upon the elapse of the transmit time interval, the transmit time interval governing the time between each data transmit cycle; and communicating the second dataset to the remote server and writing the second dataset to the main dataset recorded in the database associated with the remote server.

18. The method of claim 14, wherein the second wake command is triggered by one or more of the elapse of a time period and a command received from an external source via the wireless network interface controller.

19. The method of claim 14, wherein the low power mode configurable as one or more of a sleep mode, a standby mode, a low power run mode, a low power sleep mode, and a stop mode.

20. The method of claim 14, wherein a thermostat is connected to the wireless local network, the steps further comprising:

transmitting one or both of the first data point and the first dataset to the thermostat.

21. The method of claim 14, wherein a user device is in data communication with the wireless network interface controller, the steps further comprising:

connecting the user device to the sensor device through the wireless local network or to the remote server; and receiving a command, from the user device, the command comprising one or both of a configuration and a firmware update.

22. The method of claim 21, wherein the command further comprises the second wake command.

23. The method of claim 14, wherein the first dataset further comprises one or more of a unique sensor device name, a sensor device location, a data point collection time, a temperature data point, a light intensity data point, a light detection data point, a motion detection data point, a leak detection data point, a sound detection data point, and a humidity data point.

24. The method of claim 14, wherein the sensor comprises one or more of a temperature sensor, a humidity sensor, a light sensor, a leak sensor, a sound sensor, and a motion sensor.

25. The method of claim 14, the steps further comprising:

performing a firmware update check during the active mode when in data communication with the remote server, wherein the frequency of the firmware update check is determined by one or both of a firmware update interval and an update command received from the remote server or a user device.

* * * * *